United States Patent
Takahashi

(10) Patent No.: US 8,336,781 B2
(45) Date of Patent: Dec. 25, 2012

(54) FIXING DEVICE FOR HAND SCANNER AND INFORMATION PROCESSING APPARATUS

(75) Inventor: Nobuyuki Takahashi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 319 days.

(21) Appl. No.: 12/749,559

(22) Filed: Mar. 30, 2010

(65) Prior Publication Data
US 2010/0258634 A1    Oct. 14, 2010

(30) Foreign Application Priority Data
Apr. 8, 2009    (JP) .................... 2009-094317

(51) Int. Cl.
G06K 7/10    (2006.01)
(52) U.S. Cl. .............. 235/472.01; 235/462.45
(58) Field of Classification Search ............ 235/462.44, 235/462.45, 462.46, 462.47, 472.01, 472.02, 235/472.03
See application file for complete search history.

(56) References Cited

U.S. PATENT DOCUMENTS 5,886,337 A * 3/1999 Rockstein et al. ....... 235/472.01
6,216,951 B1 * 4/2001 Swift et al. ............. 235/462.45

FOREIGN PATENT DOCUMENTS

| JP | 59-126346 | 8/1984 |
| JP | 10-320498 | 12/1998 |
| JP | 2002-140661 | 5/2002 |

OTHER PUBLICATIONS

Japanese Office Action for Japanese Patent Application No. 2009-094317 Mailed on Jan. 4, 2011.

* cited by examiner

*Primary Examiner* — Karl D Frech
(74) *Attorney, Agent, or Firm* — Turocy & Watson, LLP

(57) ABSTRACT

An information processing apparatus includes a hand scanner including a head section having a reading section configured to read a mark affixed to a commodity and a handle having width formed smaller than that of the head section, a fixing device including a holding section having, from a part of the periphery to the center thereof, an opening formed wider than the width of the handle and movable sections provided to be opposed to each other in the opening, arranged to have width therebetween smaller than the width of the handle, and configured to move until the width therebetween increases to width same as or larger than the width of the handle when the handle is inserted through the opening, and control unit configured to enable the reading section to read the commodity according to movement of the movable sections.

9 Claims, 6 Drawing Sheets

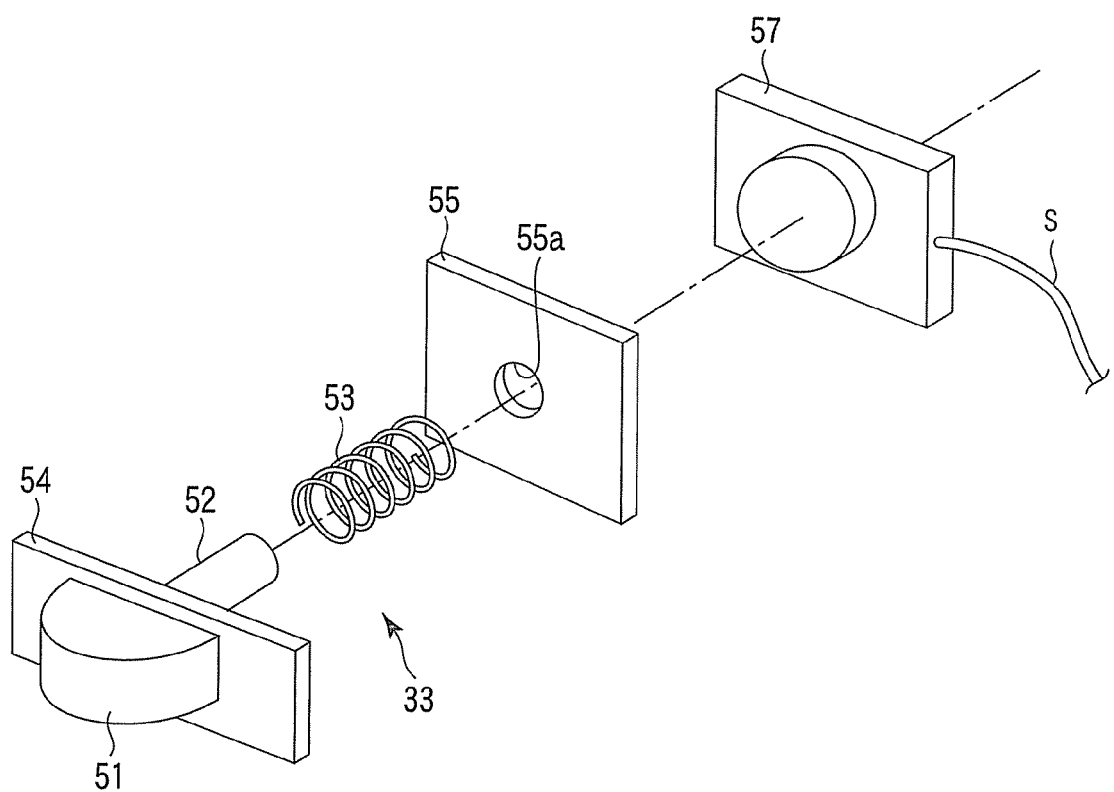
F I G. 5

FIXING DEVICE FOR HAND SCANNER AND INFORMATION PROCESSING APPARATUS

CROSS-REFERENCE TO RELATED APPLICATION

This application is based upon and claims the benefit of priority from the prior Japanese Patent Application No. 2009-094317, filed on Apr. 8, 2009, the entire contents of which are incorporated herein by reference.

TECHNICAL FIELD

The present invention relates to a fixing device for a hand scanner that reads a barcode with a laser beam and an information processing apparatus including the fixing device.

BACKGROUND

A POS terminal and a vertical scanner are used as information processing apparatuses of a POS system provided on a register counter in a store. As the arrangement of these information processing apparatuses, for example, the POS terminal is arranged on a register table and the vertical scanner is arranged on a sucker table (a sink cabinet).

The vertical scanner reads a barcode and the like through optical mark recognition. Since the vertical scanner is arranged to be fixed to the sucker table, an operator moves commodities to the vertical scanner. It is difficult to read barcodes of heavy commodities and the like using the vertical scanner. Therefore, as the POS terminal and the vertical scanner, there is also known a vertical scanner having a small hand scanner capable of reading a barcode through optical mark recognition.

The hand scanner is connected to the information processes apparatuses by a signal cable or the like. When the operator brings the hand scanner close to a barcode of a commodity, the hand scanner reads the barcode with a laser beam.

When not in use, the hand scanner is placed in a fixing device (a dedicated stand) set in the register table, the sucker table, the vertical scanner, the register counter, or the like. JP-A-2002-140661 discloses a fixing device for a hand scanner manufactured by bending a sheet-like member having a hole. There is also known a fixing device with which the hand scanner can be hooked to a side of the vertical scanner.

However, the fixing device for the hand scanner and the information processing apparatuses have problems explained below. When the fixing device is used, it is likely that, when the hand scanner is not in use, the hand scanner drops from the fixing device because a shopping basket or the like touches a cable of the hand scanner.

Since the hand scanner always generates a laser beam, it is also likely that the laser beam enters the eyes of a customer because of placement or drop of the hand scanner.

SUMMARY

It is an object of the present invention to provide a fixing device for a hand scanner capable of preventing the hand scanner from dropping and an information processing apparatus.

According to an aspect of the present invention, there is provided a fixing device for a hand scanner including a head section having a reading section configured to read a mark affixed to a commodity and a handle having width formed smaller than that of the head section, the fixing device including: a holding section having, from a part of the periphery to the center thereof, an opening formed wider than the width of the handle and configured to hold the hand scanner with the handle inserted through the opening; and movable sections provided to be opposed to each other in the opening, arranged to have width therebetween smaller than the width of the handle, and configured to move until the width therebetween increases to width same as or larger than the width of the handle when the handle is inserted through the opening.

According to another aspect of the present invention, there is provided an information processing apparatus including: a hand scanner including a head section having a reading section configured to read a mark affixed to a commodity and a handle having width formed smaller than that of the head section; and a fixing device including a holding section having, from a part of the periphery to the center thereof, an opening formed wider than the width of the handle and configured to hold the hand scanner with the handle inserted through the opening and movable sections provided to be opposed to each other in the opening, arranged to have width therebetween smaller than the width of the handle, and configured to move until the width therebetween increases to width same as or larger than the width of the handle when the handle is inserted through the opening.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a disassembled perspective view of the main part configuration of the fixing device.

DETAILED DESCRIPTION

A POS system 100 according to an embodiment of the present invention is explained below with reference to FIGS. 1 to 6.

Figure 1:
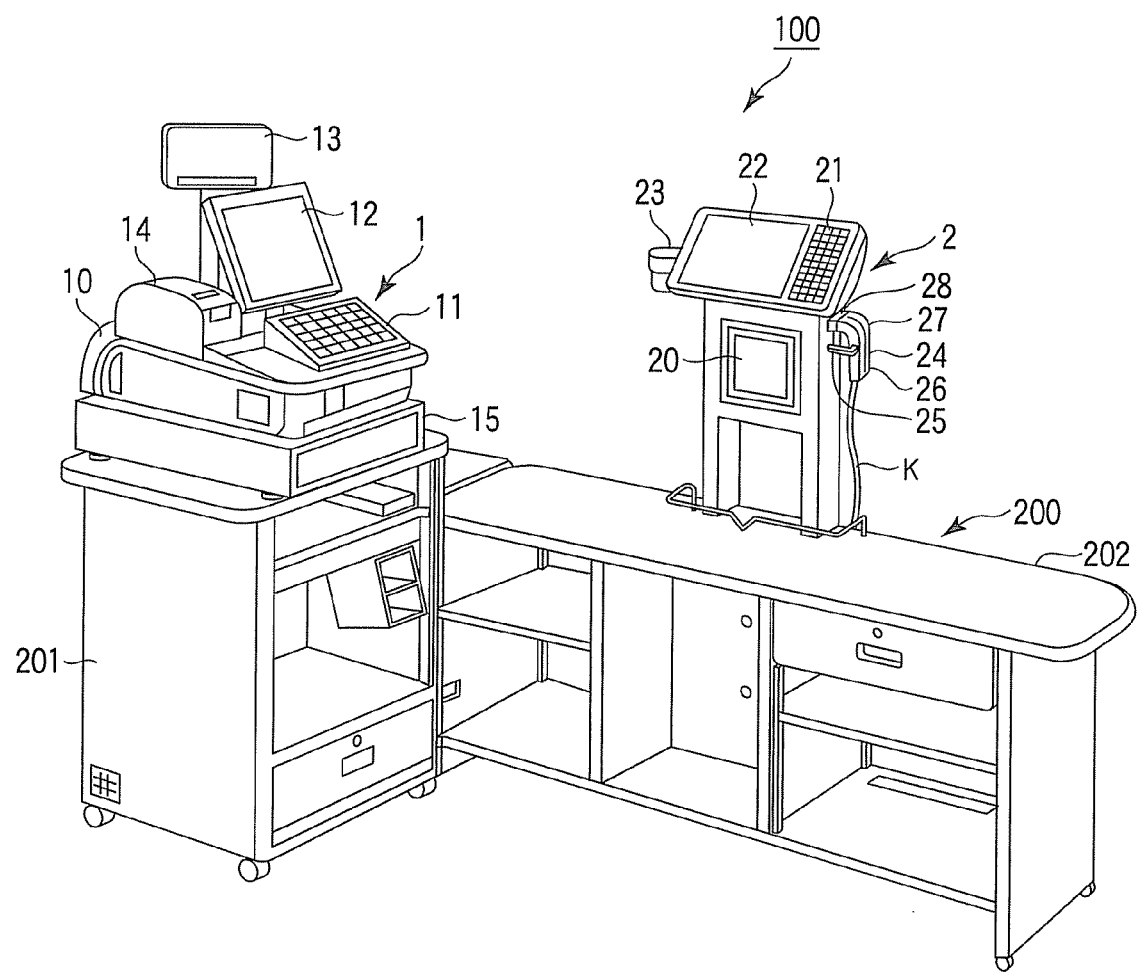
FIG. 1 is a perspective view of the configuration of a POS system according to an embodiment of the present invention.

FIG. 1 is a perspective view of the configuration of the POS system 100 according to this embodiment.

Figure 2:
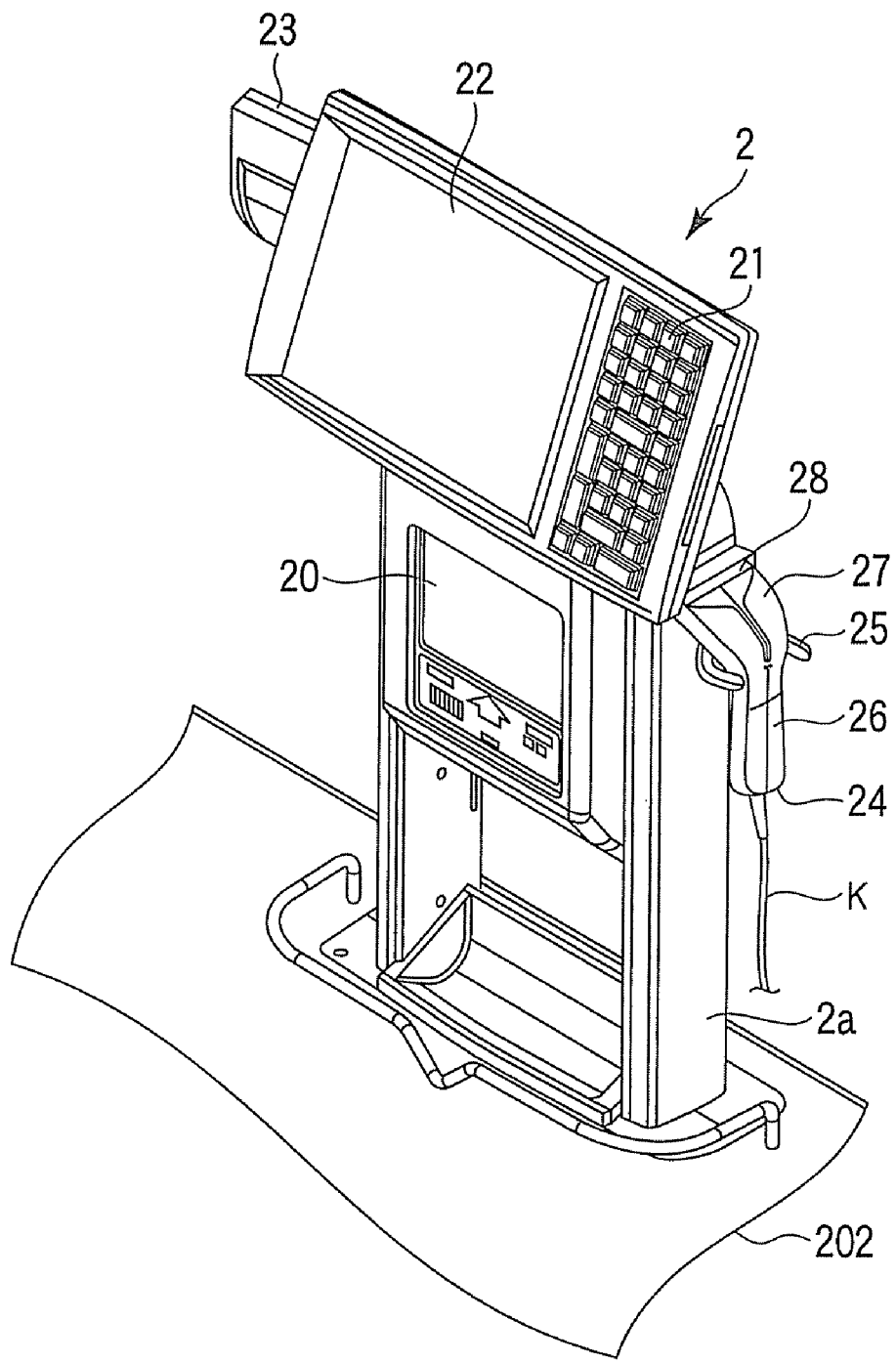
FIG. 2 is a perspective view of the configuration of a vertical scanner and a hand scanner used in the POS system.

FIG. 2 is a perspective view of the configuration of a vertical scanner 2 and a hand scanner 24 used in the POS system 100.

Figure 3:
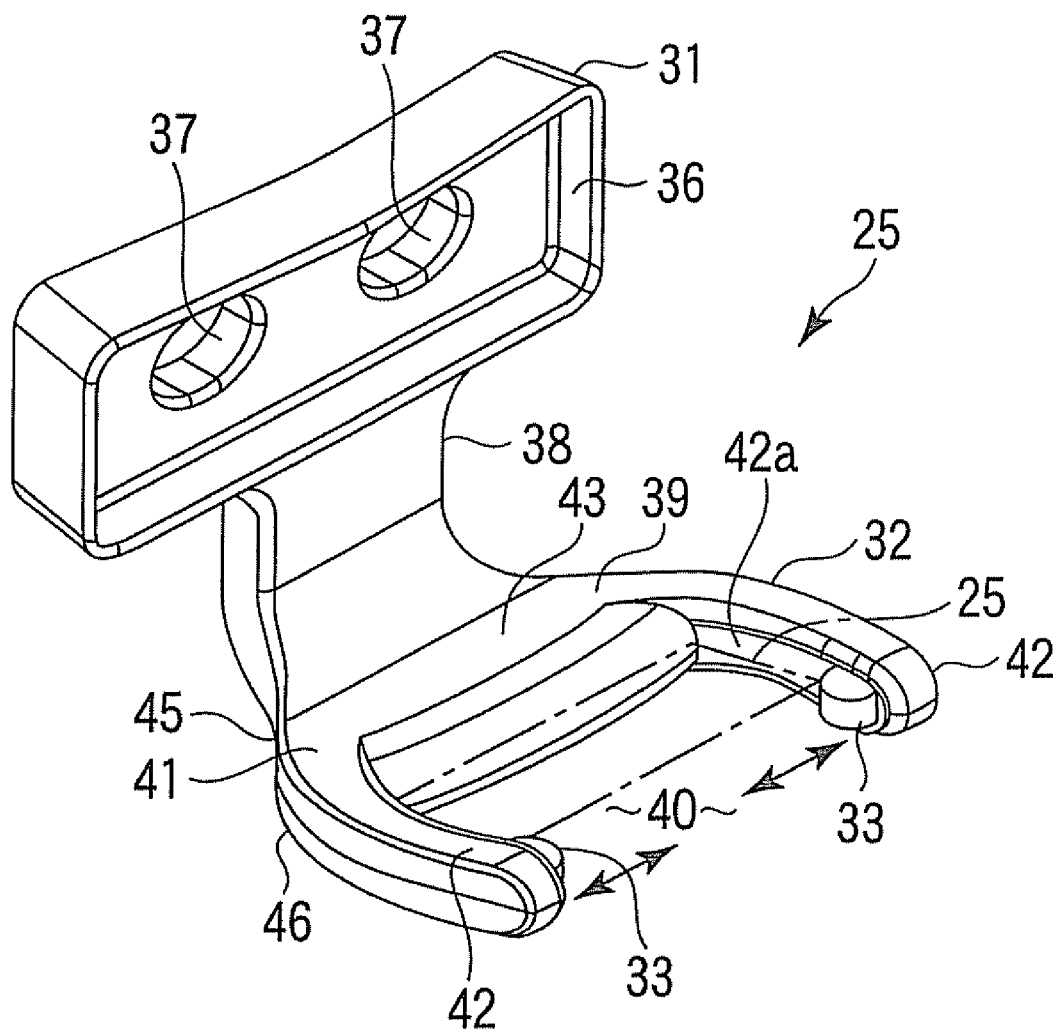
FIG. 3 is a perspective view of the configuration of a fixing device configured to hold the hand scanner.

FIG. 3 is a perspective view of the configuration of a fixing device 25 configured to hold the hand scanner 24.

Figure 4:
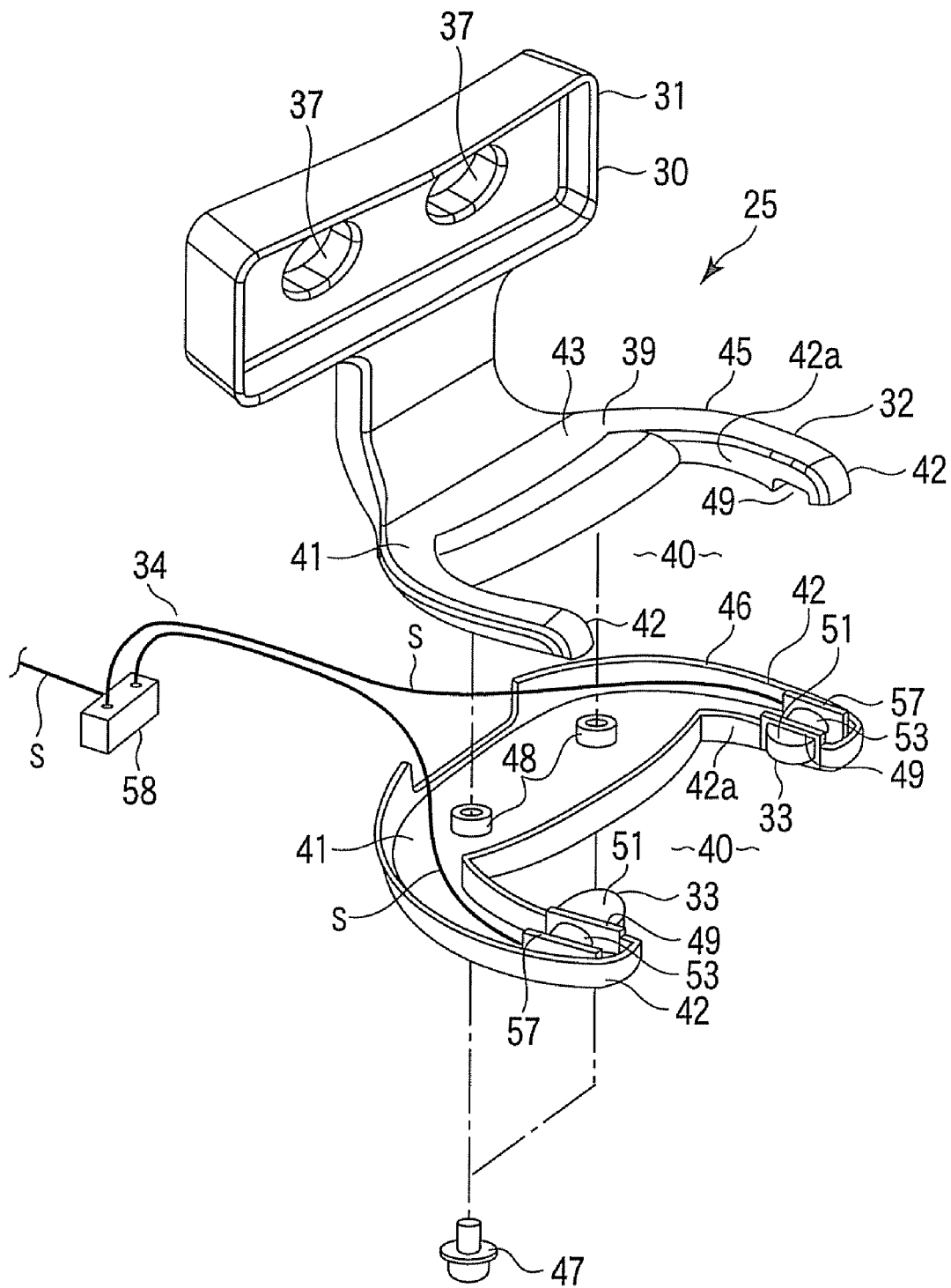
FIG. 4 is a disassembled perspective view of the configuration of the fixing device.

FIG. 4 is a disassembled perspective view of the configuration of the fixing device 25.

FIG. 5 is a disassembled perspective view of the main part configuration of the fixing device 25.

Figure 6:
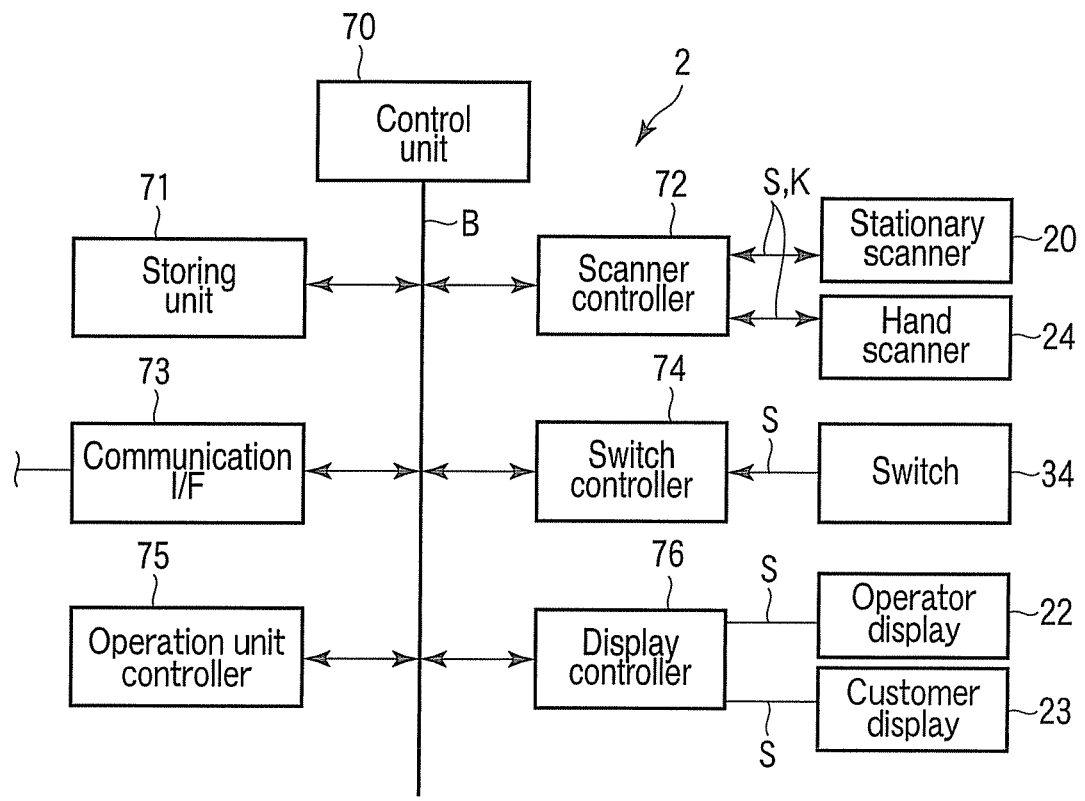
FIG. 6 is a schematic block diagram of the configuration of the vertical scanner.

FIG. 6 is a schematic block diagram of the configuration of the vertical scanner 2.

In FIGS. 1 to 6, B indicates a bus line, K indicates a cable, and S indicates a signal line.

As shown in FIG. 1, the POS system 100 is provided on a register counter 200 in a supermarket or the like. The POS system 100 includes a POS terminal 1 and the vertical scanner 2 including the hand scanner 24.

The register counter 200 includes a register table 201 and a sucker table 202. For example, in the register counter 200, the register table 201 and the sucker table 202 are arranged in an L shape. The register counter 200 does not have to be formed in the L shape. The register counter 200 may include one of the register table 201 and the sucker table 202 or may include other tables.

The POS terminal 1 is an information processing apparatus. The POS terminal 1 is arranged on the register table 201. The POS terminal 1 includes a housing 10, a keyboard 11, an operator display 12, a customer display 13, a printer 14, and a drawer 15. The POS terminal 1 includes a communication interface connected to a server and the vertical scanner 2.

The vertical scanner 2 is an information processing apparatus. As shown in FIGS. 1 and 2, the vertical scanner 2 is fixed on the sucker table 202 having spaces for placing shopping baskets on the left and right of the vertical scanner 2. The vertical scanner 2 includes a stationary scanner 20, a keyboard 21, an operator display 22, a customer display 23, and the hand scanner 24. The vertical scanner 2 includes the fixing device 25 for the hand scanner 24, for example, on a side of the vertical scanner 2 and below the operator display 22.

The stationary scanner 20 optically scans and reads a mark affixed to a commodity. The mark is, for example, a barcode. The stationary scanner 20 has a so-called optical mark recognition (OMR) function. The stationary scanner 20 emits a laser beam for optically scanning and reading the barcode. The stationary scanner 20 scans the barcode with the emitted laser beam. The stationary scanner 20 reads information described in the scanned barcode. As the operator display 22, for example, a touch panel display is used.

The hand scanner 24 has an optical mark recognition function. The hand scanner 24 recognizes a barcode affixed to a commodity in the same manner as the stationary scanner 20. As shown in FIG. 2, the hand scanner 24 includes a handle 26, a head section 27, a recognition section 28, and the cable K.

The handle 26 is formed in a shape of a bar gripped by an operator. The width on at least one end side of the handle 26 is smaller than the width of the body of the handle 26.

The head section 27 is continuous from one end side of the handle 26. The width of the head section 27 is formed larger than the width of the handle 26. The head section 27 is provided integrally with the handle 26 while being bent or curved from the handle 26. Specifically, a side shape of the hand scanner 24 is formed in an L shape by bending the head section 27 from the handle 26. In the hand scanner 24, the head section 27 having width larger than the width of the handle 26 is continuously provided on one end side where the width of the handle 26 is small. Therefore, in the hand scanner 24, the handle 26 and the head section 27 continue to each other via the narrow part.

The recognition section 28 is a reading section. The recognition section 28 emits, for example, a laser beam for scanning a barcode. The recognition section 28 is formed to be capable of reading the barcode scanned by the laser beam. The cable K is connected to, for example, the vertical scanner 2.

The fixing device 25 receives the hand scanner 24 placed thereon to hold the hand scanner 24. Specifically, as shown in FIGS. 2 to 5, the fixing device 25 includes an attaching section 31, a hooking section 32, movable sections 33, and a detecting unit 34.

The attaching section 31 includes a square attaching base 36 and bolt holes 37 provided in the attaching base 36. The attaching section 31 is attached to the side of the vertical scanner 2 by bolts. The attaching section 31 may be attached by screws or may be attached by other fixing members.

The hooking section 32 hooks and holds the hand scanner 24. The hooking section 32 is provided in the attaching section 31. For example, the hooking section 32 is provided on the lower surface side of the attaching base 36 of the attaching section 31. The hooking section 32 includes a coupling member 38 continuously connected to the attaching section 31 and a holding section 39 connected to the coupling member 38.

The coupling member 38 projects from the lower surface of the attaching base 36. Specifically, the coupling member 38 is extended from the lower surface of the attaching base 36 to project in the vertical direction along the side of the vertical scanner 2 when the fixing device 25 is fixed to the vertical scanner 2.

The holding section 39 is provided to be bent in a direction orthogonal to an extending direction of the coupling member 38 from the end side of the coupling member 38. Specifically, the holding section 39 is extended from the end side of the coupling member 38 in a direction away from the side of the vertical scanner 2 when the fixing device 25 is fixed to the vertical scanner 2.

The holding section 39 is formed in a tabular shape. A part of the holding section 39 is cut out from a part of the side of the holding section 39 toward the center side of the holding section 39. In other words, the holding section 39 has an opening 40 continuously opened from a part of the periphery of the holding section 39 to the center of the holding section 39. For example, as shown in FIG. 3, the holding section 39 is formed in a U shape by the opening 40.

For example, the handle 26 or the narrow part between the handle 26 and the head section 27 is inserted through the opening 40. An alternate long and two short dashes line in FIG. 3 indicates a section of the handle 26. As shown in FIG. 3, the opening 40 has an opening area enough for inserting the handle 26 or the narrow part.

The holding section 39 is explained below in another way. The holding section 39 includes a first holding section 41 and two second holding sections 42. The first holding section 41 is provided in a direction orthogonal to the extending direction of the coupling member 38. The first holding section 39 has predetermined width. The second holding sections 42 project in a direction same as the projecting direction of the first holding section 41 from both end sides of the end of the side of the first holding section 41 while being opposed to each other. In other words, the first holding section 41 and the second holding sections 42 are integrally provided in the holding section 39.

The opening 40 is formed in the holding section 39 from the side of the first holding section 41 by a space between the second holding sections 42 opposed to each other. Therefore, the width between the opposed second holding sections 42 is set to at least width enough for inserting the handle 26 of the hand scanner 24. The predetermined width of the first holding section 41 only has to be width enough for providing the opposed second holding sections 42 at the width explained above.

In the opening 40, a distance from the side of the first holding section 41 to the movable sections 33 explained later is formed at least larger than the width of the hand scanner 24. In other words, the opening 40 is formed as a space large enough for arranging the handle 26 of the hand scanner 24.

The holding section 39 has a holding surface 43 on upper surfaces of the first holding section 41 and the second holding sections 42. The holding surface 43 is a surface for holding the head section 27 when the hand scanner 24 is inserted through the opening 40 and set free and moves in the gravity direction by gravity. A shape of the holding surface 43 can be set as appropriate according to a shape of the head section 27.

As shown in FIG. 4, the holding section 39 has a hollow space in the inside thereof. The holding section 39 is divided into an upper part and a lower part. Specifically, the holding section 39 includes an upper member 45 having the holding surface 43, a lower member 46 assembled to the bottom of the upper member 45, and screws 47 for connecting the upper member 45 and the lower member 46.

The upper member 45 has, for example, female screw sections in the inside thereof. The upper member 45 has the first holding section 41 and the second holding sections 42. The upper member 45 is molded integrally with, for example, the attaching section 31 and the coupling member 38 by a resin material. The lower member 46 has, for example, screw holes 48 through which thread portions of the screws 47 are inserted. The upper member 45 and the lower member 46 have hole sections 49 on the distal end sides of the second holding sections 42 and on inner surfaces 42a of the second holding sections 42. In other words, the hole sections 49 are respectively provided on inner side surfaces of the opening 40 and peripheral sides of the holding section 39.

The first holding section 41 and the second holding sections 42 of the holding section 39 continue to each other. The upper member 45 and the lower member 46 respectively form an upper side and a lower side of the first holding section 41 and the second holding sections 42.

The movable sections 33 are provided in the hooking section 32. The movable sections 33 are provided to project from the hole sections 49. The movable sections 33 move from the inner surfaces 42a of the second holding sections 42 to the inner sides of the second holding sections 42 such that the tips of the movable sections 33 are located in surface positions of the inner surfaces 42a. Specifically, as indicated by arrows in FIG. 3, the movable sections 33 project from the inner surfaces 42a of the second holding sections 42 and reciprocatingly move or swing between the surface positions of the inner surfaces 42a.

The movable sections 33 are held between the upper member 45 and the lower member 46. Specifically, the movable sections 33 include contact members 51, shaft bodies 52, elastic members 53, first seats 54, and second seats 55.

The contact members 51 come into contact with the handle 26. The contact members 51 slide on the surface of the handle 26. The contact members 51 are formed in a semicircular plate shape to project from the hole sections 49. The shaft bodies 52 are provided in the contact members 51. The elastic members 53 are provided in the shaft bodies 52 and have a predetermined spring constant. As the elastic members 53, for example, coil springs are used. The coil springs 53 are provided with the shaft bodies 52 inserted through center spaces thereof. When the coil springs 53 are compressed and stretched, the contact members 51 reciprocatingly move. The predetermined spring constant is a spring constant for causing the contact members 51 to reciprocatingly move.

The first seats 54 are provided in the contact members 51 and form seating surfaces for the elastic members 53. The first seats 54 form seats for the coil springs 53 and transmit restoring force of the coil springs 53 to the contact members 51. The second seats 55 are opposed to the first seats 54 via the elastic members 53 and form seating surfaces for the elastic members 53. The second seats 55 have openings 55a in the centers thereof. When the contact members 51 are pressed and the coil springs 53 are compressed, the shaft bodies 52 are inserted through the openings 55a of the second seats 55. Seats for receiving the coil springs 53 are formed around the openings 55a.

An interval between the movable sections 33 are formed smaller than the narrow part provided in the connecting portion of the handle 26 and the head section 27. The interval between the movable sections 33 is an interval between the tips of the contact members 51 that project from the hole sections 49. When the contact members 51 of the movable sections 33 move to the inner surfaces 42a sides, the interval between the tips of the contact members 51 increases to be larger than the width of the handle 26.

When the contact members 51 move a maximum distance, the movable sections 33 become flush with the inner surfaces 42a of the second holding sections 42. Therefore, when the contact members 51 move the maximum distance, the movable sections 33 are spaced apart by the width between the opposed second holding sections 42.

The detecting unit 34 detects the movement of the movable sections 33. The detecting unit 34 is, for example, an ON-OFF switch that switches conduction and non-conduction. The detecting unit 34 includes pressed sections 57 pressed by the shaft bodies 52 and a detecting section 58 connected to the pressed sections 57 via the signal line S. The detecting unit 34 is connected to a switch controller 74 provided in the vertical scanner 2. The detecting section 58 of the detecting unit 34 and the switch controller 74 are connected by the signal line S.

In the detecting unit 34, the detecting section 58 detects information indicating that the pressed sections 57 is pressed and transmits the detected information to the switch controller 74 via the signal line S.

The configuration of the vertical scanner 2 is explained below with reference to the block diagram of the vertical scanner 2 shown in FIG. 6.

As shown in FIG. 6, the vertical scanner 2 is mounted with a control unit 70 including a CPU as a core of control and a chip set. A storing unit 71, a scanner controller 72, a communication interface (I/F) 73, the switch controller 74, an operation unit controller 75, and a display controller 76 are connected to the control unit 70 via the bus line B, which is an address bus or a data bus.

The chip set includes a north bridge and a south bridge. The north bridge controls information distribution such as management data exchange and connects the CPU and the bus line B. The south bridge has functions of the various controllers.

The storing unit 71 includes a ROM (Read Only Memory), a RAM (Random Access Memory), a BIOS-ROM (Basic Input/Output System-Read Only Memory), and a hard disk (HDD). For example, the ROM stores therein in advance, for example, a computer program for causing the control unit 70 to execute control operation. The RAM forms various memory areas used by the control unit 70 for arithmetic processing. A POST (Power-On Self Test) as a test program executed when the respective kinds of hardware are initialized, a BIOS driver, and a VGA (Video Graphics Array) driver are recorded in the BIOS-ROM.

The scanner controller 72 is connected to the stationary scanner 20 and the hand scanner 24 by the signal line S and the cable K. The scanner controller 72 controls generation and stop of laser beams by the stationary scanner 20 and the hand scanner 24. Specifically, the scanner controller 72 is formed to be capable of turning on and off, i.e., activating and stopping the scanners 20 and 24 on the basis of instructions from the control unit 70. The scanner controller 72 receives information concerning a barcode read by the stationary scanner 20 and the hand scanner 24.

The communication I/F 73 is connected to, for example, the communication I/F of the POS terminal 1 and a server system.

The switch controller 74 receives information concerning the movement or the operation of the pressed sections 57 detected by the detecting section 58. The switch controller 74 transmits the received information concerning the movement of the pressed section 57 to the scanner controller 72. For example, when operation information of the pressed sections 57 is received from the detecting unit 34, the switch controller 74 transmits the information to the scanner controller 72. The scanner controller 72 switches on and off of the hand scanner 24 every time the information is received.

The keyboard 21 as an operation unit including a ten key and the operator display 22 are connected to the operation unit controller 75. The operation unit controller 75 receives information input from the keyboard 21 and the display 22 and transmits the information to the display controller 76.

The display controller 76 is connected to the operator display 22 and the customer display 23. The display controller 76 displays, on the displays 22 and 23, the information received from the operation unit controller 75 and the information concerning the barcode read by the stationary scanner 20 and the hand scanner 24. The display controller 76 displays messages and the like on the displays 22 and 23 and captures input data corresponding to operation units connected to the operation unit controller 75.

The control unit 70 has, as a main function, a control function for enabling the recognition section 28 of the hand scanner 24 to read a barcode at least in a state in which the hand scanner 24 held by the hooking section 32 of the fixing device 25 is detached from the hooking section 32. Specifically, the control unit 70 has a control function for switching on and off of the hand scanner 24 with the scanner controller 72.

The control function is a function of turning off the hand scanner 24 when the hand scanner 24 is held by the hooking section 32 of the fixing device 25. The control function is a function of turning on the hand scanner 24 when the hand scanner 24 is detached from the hooking section 32.

Specifically, when the detecting unit 34 is off, the scanner controller 72 turns off the hand scanner 24 according to information detected by the switch controller 74. When the detecting unit 34 is on, the scanner controller 72 turns on the hand scanner 24 according to information detected by the switch controller 74.

The use of the hand scanner 24 of the POS system 100 configured as above is explained below.

As basic operation, in reading of a barcode, the operator detaches the hand scanner 24 from the fixing device 25, brings the recognition section 28 close to the barcode to be read, and reads the barcode. After ending the reading of the barcode, i.e., except when the barcode is read, the operator hooks the hand scanner 24 to the hooking section 32 of the fixing device 25 to hold the hand scanner 24 in the holding section 39.

The reading of a barcode performed by using the hand scanner 24 is explained below.

First, in reading a barcode, the operator detaches the hand scanner 24 from the opening 40 of the fixing device 25. When detached, the hand scanner 24 passes between the movable sections 33 provided between the second holding sections 42. The interval of the movable sections 33 opposed to each other is smaller than the narrow part of the continuous section of the handle 26 and the head section 27.

Therefore, the handle 26 or the narrow part and the contact members 51 of the movable sections 33 come into contact with each other. Since the contact members 51 are formed in the semicircular plate shape, the sides of the contact members 51, with which the handle 26 comes into contact, have a curved surface shape. Therefore, when the handle 26 comes into contact with the contact members 51 having the semicircular plate shape, force in a detaching direction applied to the contact members 51 by the handle 26 is applied not only in the detaching direction of the handle 26 but also in compressing directions for compressing the coil springs 53.

According to the compression of the coil springs 53, the contact members 51 move to the inner surfaces 42a sides of the second holding sections 42 and the outer surface of the handle 26 slides on the surfaces of the contact members 51. Consequently, the contact members 51 move to the inner surfaces 42a sides of the second holding sections 42. According to the movement of the contact members 51, the interval between the movable sections 33 increases to width same as the width of the handle 26 that passes between the movable sections 33. Consequently, the hand scanner 24 is detached from the fixing device 25.

When the movable sections 33 move, the contact members 51 and the shaft bodies 52 also move. Consequently, the shaft bodies 52 operate the pressed sections 57. When the pressed sections 57 are operated, the detecting section 58 detects the operation. The switch controller 74 transmits information concerning the detection to the scanner controller 72. The scanner controller 72 turns on and off the hand scanner 24 according to the detection information.

Since the hand scanner 24 held by the fixing device 25 is off, when the hand scanner 24 is detached from the fixing device 25, the hand scanner 24 is turned on.

When the hand scanner 24 is turned on, the hand scanner 24 emits a laser beam from the recognition section 28. The operator irradiates a laser beam emitted from the hand scanner 24 on the barcode, whereby the barcode is optically scanned and information of the barcode is read.

The control unit 70 compares the read information of the barcode with commodity information stored in a server or the like connected to the communication I/F 73 and retrieves commodity information same as the information of the barcode. After retrieving the commodity information same as the information of the barcode, the control unit 70 transmits the commodity information to the display controller 76 and displays the commodity information on the displays 22 and 23.

The holding of the hand scanner 24 is explained below.

After ending the reading of the barcode, the operator inserts the handle 26 of the hand scanner 24 or the narrow part of the continuous section of the handle 26 and the head section 27 into the opening 40. When the handle 26 or the narrow part is inserted, the width of the handle 26 is larger than the interval between the contact members 51 (the movable sections 33). Therefore, the outer surface of the handle 26 comes into contact with the contact member 51.

When the outer surface of the handle 26 comes into contact with the contact members 51 having the semicircular plate shape, force in an inserting direction of the handle 26 is applied not only in the inserting direction of the handle 26 but also in the compressing directions for compressing the coil springs 53. Consequently, the contact members 51 move to the inner surfaces 42a sides of the second holding sections 42 and the outer surface of the handle 26 slides on the surfaces of the contact members 51.

Therefore, the width of the handle 26 and the interval between the movable sections 33 become substantially the same and the handle 26 can be inserted into the opening 40. As indicated by the alternate long and two short dashes line in FIG. 3, the handle 26 approaches the first holding section 41 and the second holding sections 42.

When the operator releases the handle 26 in this state, the hand scanner 24 falls in the center of gravity direction. However, the outer surface of the lower part of the head section 27 comes into contact with the holding surface 43 of the first holding section 41 and the second holding sections 42. Consequently, the holding section 39 holds the hand scanner 24.

Since the handle 26 does not interfere with the movable sections 33, the movable sections 33 project from the inner surfaces 42a of the second holding sections 42 with the restoring force of the coil springs 53. Consequently, the hand scanner 24 is prevented from dropping from the holding section 39.

In this way, when the hand scanner 24 is fixed to the fixing device 25, the contact members 51 of the movable sections 33 move because of the interference of the handle 26. According to the movement of the contact members 51, the shaft bodies 52 also move. The shaft bodies 52 operate the pressed sections 57 and the detecting sections 58 detect the operation. The switch controller 74 transmits information concerning the detection to the scanner controller 72. The scanner controller 72 turns on and off the hand scanner 24 according to the detection information.

Since the hand scanner 24 detached from the fixing device 25 is on, when the hand scanner 24 is held by the fixing device 25, the hand scanner 24 is turned off.

With the POS system 100 configured as explained above, the width of the opening 40 is changed by the movable contact members 51 and the hand scanner 24 can be held by the holding section 39. The contact members 51 prevent the hand scanner 24 from dropping from the holding section 39.

The contact members 51 always opposed to each other are pressed toward each other by the restoring force of the coil springs 53. In other words, the coil springs 53 urge the contact members 51 in directions opposed to each other.

Even if the hand scanner 24 moves in the detaching direction from the holding section 39, since the contact members 51 come into contact with the handle 26, the contact members 51 prevent the hand scanner 24 from dropping from the holding section 39. The spring constant of the coil springs 53 only has to be enough for generating restoring force of the coil springs 53 for preventing the hand scanner 24 from dropping from the movable sections 33 as long as the operator does not move the hand scanner 24.

Therefore, for example, when commodities are registered or when a customer places a shopping basket on the register counter 200, even if the hand scanner 24 moves because the shopping basket touches the cable K provided in the hand scanner 24, the hand scanner 24 is prevented from dropping from the fixing device 25 by the movable sections 33.

Since the fixing device 25 is provided on the side of the vertical scanner 2, it is easy to hold the hand scanner 24. The operator can easily grip the hand scanner 24 and attach and detach the hand scanner 24 to and from the fixing device 25. Since the fixing device 25 for the hand scanner 24 can be attached to the vertical scanner 2 by the bolts, it is easy to attach the fixing device 25. The operator can arrange the hand scanner 24 in a position where the operator can easily take the hand scanner 24.

Further, the fixing device 25 can be provided in the existing vertical scanner 2. Therefore, the universality of the fixing device 25 is high. When the fixing device 25 is used in the existing vertical scanner 2, in some case, it is difficult to turn on and off the hand scanner 24 by attaching and detaching the hand scanner 24 to and from the fixing device 25. However, when the hand scanner 24 cannot be turned on and off by attaching and detaching the hand scanner 24, the fixing device 25 only has to be used as the fixing device 25 that can perform only the holding of the hand scanner 24. In this case, the detecting unit 34 only has to be removed from the configuration.

When the hand scanner 24 is held by the fixing device 25, the hand scanner 24 is turned off and a laser beam is not emitted from the recognition section 28. Therefore, when the hand scanner 24 is held by the fixing device 25, even if the hand scanner 24 shifts, a laser beam does not enter the eyes of a customer. Consequently, it is unlikely that the customer is displeased.

Further, when the hand scanner 24 is detached from the fixing device 25, a laser beam is emitted and a barcode can be read. In other words, the laser beam is emitted only when the barcode is read. Consequently, when the hand scanner 24 is detached from the fixing device 25, the barcode can be surely read by the recognition section 28 of the hand scanner 24. Further, since emission of a useless laser beam is prevented, an energy saving effect is high.

As explained above, with the POS system 100 according to this embodiment, when the handle 26 of the hand scanner 24 moves in the opening 40, the movable sections 33 move and the scanner controller 72 turns on and off the hand scanner 24. Therefore, it is possible to stop the hand scanner 24 simply by attaching the hand scanner 24 to the fixing device 25. Also, it is possible to activate the hand scanner 24 simply by detaching the hand scanner 24 from the fixing device 25. Therefore, a barcode of a commodity can be read by the hand scanner 24. If the hand scanner 24 is held by the holding section 39, the movable sections 33 prevent the hand scanner 24 from dropping.

The present invention is not limited to the embodiment. In the example explained above, the hand scanner 24 and the fixing device 25 are provided in the vertical scanner 2. However, the present invention is not limited to this. For example, the hand scanner 24 and the fixing device 25 may be used in the POS terminal 1. The hand scanner 24 and the fixing device 25 may be used in an information processing apparatus including a hand scanner other than the POS terminal 1 and the vertical scanner 2.

In the example explained above, the movable sections 33 is configured by combining the contact members 51, the shaft bodies 52 provided in the contact members 51, and the coil springs 53 as the elastic members provided in the shaft bodies 52. However, the present invention is not limited to this. For example, the elastic members 53 may be resin members having restoring force rather than the coil springs. The contact members 51 may be contact members formed of an elastic material and having the function of the elastic members 53.

In the fixing device 25, the size of the opening 40 and the shape and the dimensions of the contact members 51 may be changed as appropriate according to the dimensions and the shape of the handle 26 of the hand scanner 24. It is possible to apply the fixing device 25 to various hand scanners 24 by changing the size of the opening 40 and the shape and the dimensions of the contact members 51.

Further, in the detecting unit 34, the shape of the pressed sections 57 can be changed as appropriate according to the shape of the movable sections 33. The detecting unit 34 does not have to be the configuration explained above and may be a micro switch or a button switch or may be a proximity sensor. In other words, the detecting unit 34 only has to be capable of detecting the movement of the movable sections 33.

In the example explained above, the recognition section 28 emits a laser beam. However, the present invention is not limited to this. The recognition section may be capable of reading a commodity with, for example, a CCD camera rather than the laser beam. The recognition section may be capable of reading a two-dimensional code rather than the barcode.

In the example explained above, the control unit 70 has, as the main function, the control function for turning on and off the hand scanner 24. However, the present invention is not limited to this. For example, when the CCD camera is used in the recognition section, it is unlikely that the laser bema is irradiated on a customer. Therefore, a mark of a commodity only has to be readable by the recognition section 28 at least in a state in which the hand scanner 24 held by the hooking section 32 of the fixing device 25 is detached from the hooking section 32. Besides, various modifications of the embodiment are possible without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A fixing device for a hand scanner including a head section having a reading section configured to read a mark affixed to a commodity and a handle having width formed smaller than that of the head section, the fixing devibe comprising:
   a holding section having, from a part of a periphery to a center thereof, an opening formed wider than the width of the handle and configured to hold the hand scanner with the handle inserted through the opening; and
   movable sections provided to be opposed to each other in the opening and arranged to have width therebetween smaller than the width of the handle, the movable sections comprising contact members configured to contact the handle and elastic members configured to urge the contact members in directions opposed to each other with predetermined force and elastically move to reciprocate the contact members, and the movable sections and configured to move the contact members until the width between the contact members becomes equal to or larger than the width of the handle when the handle is inserted through the opening.

2. The device according to claim 1, further comprising an attaching section provided in the holding section and configured to fix the holding section on a side of an information processing apparatus.

3. An information processing apparatus comprising:
   a hand scanner including a head section having a reading section configured to read a mark affixed to a commodity and a handle having width formed smaller than that of the head section; and
   a fixing device including a holding section having an opening formed from a part of a periphery to a center thereof and formed wider than the width of the handle, the holding section configured to hold the hand scanner with the handle inserted through the opening, the fixing device further including movable sections provided to be opposed to each other in the opening and arranged to have width therebetween smaller than the width of the handle, the movable sections comprising contact members configured to contact the handle and elastic members configured to urge the contact members in directions opposed to each other with predetermined force and elastically move to reciprocate the contact members, and the movable sections configured to move the contact members until the width between the contact members becomes equal to or larger than the width of the handle when the handle is inserted through the opening.

4. The apparatus according to claim 3, further comprising a control unit configured to enable the reading section to read the commodity according to movement of the movable sections at the time when the hand scanner is detached from the holding section.

5. The apparatus according to claim 4, wherein
   the hand scanner emits a laser beam for scanning the mark from the reading section;
   the fixing device includes a detecting unit configured to detect movement of the movable sections at the time when the handle is inserted through the opening and transmit information concerning the detected movement of the movable sections to the control unit; and
   the control unit receives information concerning movement of the movable sections detected when the hand scanner is held by the fixing device to stop the emission of the laser beam from the hand scanner and receives information concerning movement of the movable sections detected when the hand scanner is detached from the fixing device to cause the hand scanner to emit the laser beam.

6. The apparatus according to claim 5, further comprising a vertical scanner, wherein
   the hand scanner, the fixing device, and the control unit are provided in the vertical scanner.

7. The apparatus according to claim 6, wherein the fixing device is provided on a side of the vertical scanner.

8. The apparatus according to claim 3, further comprising a vertical scanner, wherein
   the hand scanner and the fixing device are provided in the vertical scanner.

9. The apparatus according to claim 8, wherein the fixing device is provided on a side of the vertical scanner.

* * * * *